(12) United States Patent
Bakthavachalam et al.

(10) Patent No.: US 11,032,263 B2
(45) Date of Patent: *Jun. 8, 2021

(54) PROVIDE ACCESS TO DATA STORAGE SERVICES IN A NETWORK ENVIRONMENT

(71) Applicant: International Business Machines Corporation, Armonk, NY (US)

(72) Inventors: Senthil Bakthavachalam, Yorktown Heights, NY (US); Paul R. Bastide, Boxford, MA (US); Hubertus Franke, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,147

(22) Filed: Feb. 6, 2020

(65) Prior Publication Data
US 2020/0177570 A1    Jun. 4, 2020

Related U.S. Application Data

(63) Continuation of application No. 15/838,321, filed on Dec. 11, 2017, now Pat. No. 10,601,804.

(51) Int. Cl.
*H04L 29/06* (2006.01)
*G06F 21/62* (2013.01)

(52) U.S. Cl.
CPC .......... *H04L 63/08* (2013.01); *G06F 21/6218* (2013.01); *H04L 63/0807* (2013.01); *H04L 63/10* (2013.01); *H04L 63/104* (2013.01)

(58) Field of Classification Search
CPC . H04L 63/08; H04L 63/0807; H04L 63/0823; H04L 63/10; H04L 63/101;

(Continued)

(56) References Cited

U.S. PATENT DOCUMENTS 8,417,723 B1 * 4/2013 Lissack .................. G06F 16/13
                                                                707/781
9,069,979 B2   6/2015 Srinivasan et al.
                        (Continued)

FOREIGN PATENT DOCUMENTS

CN       102307185       1/2012
WO       2014083449      10/2013

OTHER PUBLICATIONS

English Abstract and Machine Translation for CN102307185A, published on Jan. 4, 2012, Total 20 pp.

(Continued)

*Primary Examiner* — Edward Zee
(74) *Attorney, Agent, or Firm* — Konrad Raynes Davda & Victor LLP; David W. Victor

(57) ABSTRACT

Provided are a computer program product, system, and method for providing access to data storage services in a network environment. Multi-tenancy information for each of a plurality of clients has at least one tenant assigned to the client, at least one data source assigned to the tenant assigned to the client, and for each of the at least one data source, information on at least one user assigned to the data source and permitted access to the data source. A user is provided an isolate tag comprising a client tag identifying one client, a tenant tag identifying one tenant, and a data source tag identifying one data source to which the user is permitted to access data. A user access request with an isolate tag is processed in response to determining that the multi-tenancy information indicates that the client, tenant, and data source identified by the isolate tag are related.

21 Claims, 7 Drawing Sheets

(58) Field of Classification Search
CPC ... H04L 63/102; H04L 63/104; H04L 63/105; G06F 21/62; G06F 21/6218
See application file for complete search history.

(56) References Cited

U.S. PATENT DOCUMENTS

| | | | |
|---|---|---|---|
| 9,294,507 B1 | 3/2016 | Roth et al. | |
| 9,774,586 B1 * | 9/2017 | Roche | G06F 21/6218 |
| 2006/0235831 A1 | 10/2006 | Adinolfi et al. | |
| 2016/0004734 A1 | 1/2016 | Naryzhny et al. | |
| 2017/0220364 A1 | 8/2017 | Kadioglu et al. | |
| 2017/0344754 A1 | 11/2017 | Kumar et al. | |
| 2019/0182226 A1 | 6/2019 | Bakthavachalam et al. | |

OTHER PUBLICATIONS

Ferrell, T., "Method for Data Persistence in an Untrusted Store", Mar. 8, 2017, IPCOM000249628D, retrieved from the Internet at <URL: http://ip.com/IPCOM/000249628>, Total 4 pp.

Hummen, R., M. Henze, D. Catrein, and K. Wehrle, "A Cloud Design for User-controlled Storage and Processing of Sensor Data", 2012 IEEE 4th International Conference on Cloud Computing Technology and Science (CloudCom), IEEE, 2012, Total 9 pp.

Motahari-Nezhad, H.R., B. Stephenson, and S. Singhal, "Outsourcing Business to Cloud Computing Services: Opportunities and Challenges", White Paper, HP Laboratories, HPL-2009-23, 2009, © Copyright 2009 Hewlett-Packard Development Company, L.P., Total 17 pp.

Office Action 1 for U.S. Appl. No. 15/838,321, dated Jul. 25, 2019, 18 pp. [57.419 (OA1)].

Response to Office Action 1 for U.S. Appl. No. 15/838,321, dated Oct. 25, 2019, 10 pp. [57.419 (ROA1)].

Notice of Allowance 1 for U.S. Appl. No. 15/838,321, dated Nov. 13, 2019, 9 pp. [57.419 (NOA1)].

List of IBM Patents or Patent Applications Treated as Related, dated Feb. 6, 2020, 2 pp. [57.419C1 (Appendix P)].

* cited by examiner

Client Information

Tenant Information

Data Source Information

User Information

Isolate Tag

Access Request

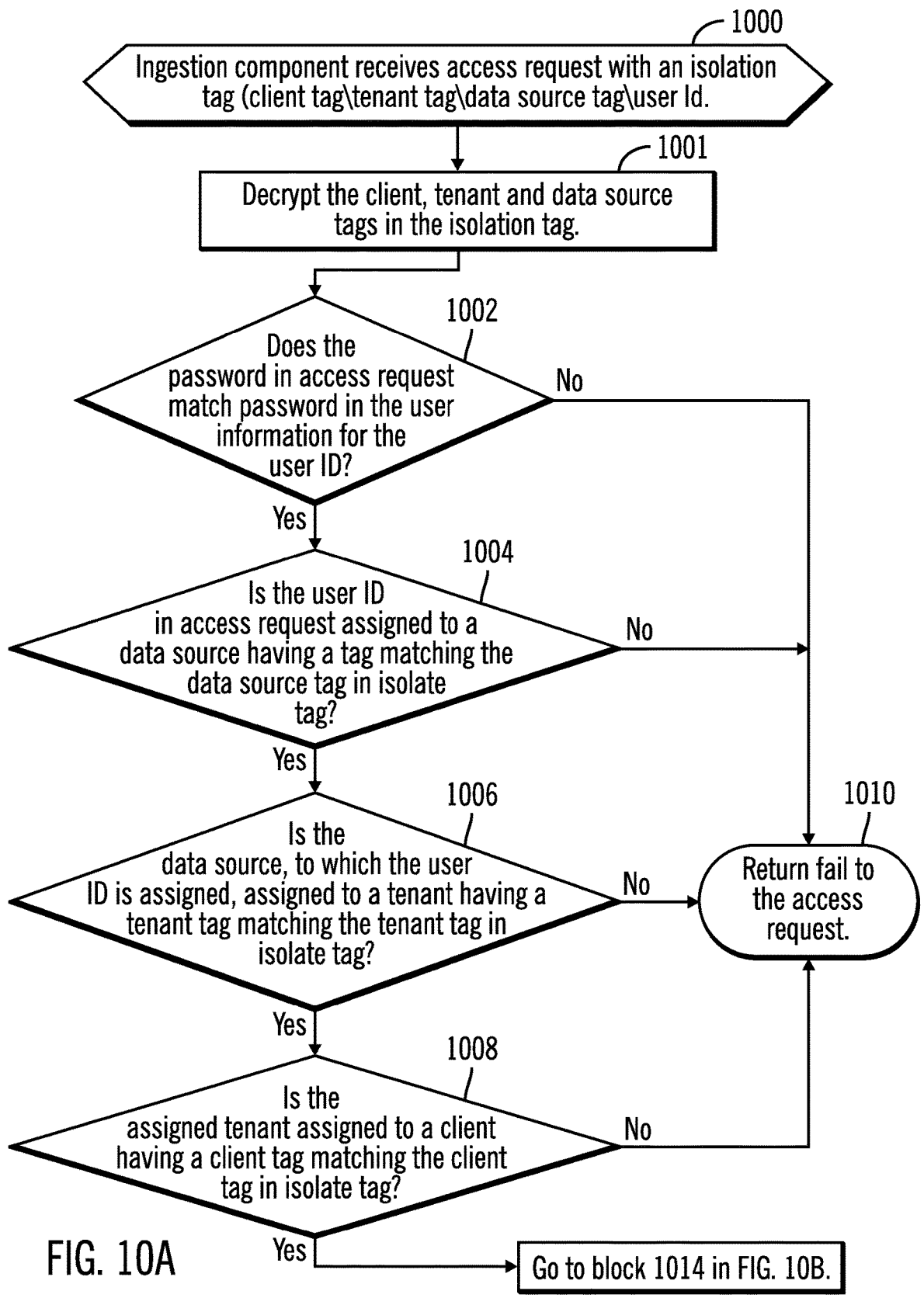

PROVIDE ACCESS TO DATA STORAGE SERVICES IN A NETWORK ENVIRONMENT

BACKGROUND OF THE INVENTION

1. Field of the Invention

The present invention relates to a computer program product, system, and method for providing data storage services in a network environment.

2. Description of the Related Art

Cloud storage services allow computer, network and storage resource to be shared among multiple tenants (users of the system). These systems substantially increase resource utilization and scalability, while driving down total-cost-of-ownership. In order to adopt these systems, many tenants (customers) require a high-level of logical isolation to sufficiently protect business interests. With highly regulated tenants (customers), Healthcare (HIPAA), Data Privacy (GDPR), and Financial (Gramm-Leach-Bliley) regulations drive strict isolation to protect data and ensure only authorized personnel can view sensitive information. These regulations are further complicated when a single customer has multiple tenants and has increased needs for isolation and economies of scale.

To isolate data and control access, the cloud storage service provider may require a user present authentication information, such as user identifier and password, to access assigned resources.

There is a need in the art for controlling access to storage services and resources in a storage network environment.

SUMMARY

Provided are a computer program product, system, and method for using hierarchical tags to provide data storage services in a network environment. Multi-tenancy information for a plurality of clients has for each client of the clients, at least one tenant assigned to the client, and for each of the at least one tenant assigned to a client, at least one data source assigned to the tenant assigned to the client, and for each of the at least one data source, information on at least one user assigned to the data source and permitted access to the data source. A user is provided an isolate tag to use when accessing data in a data source comprising a client tag identifying one client, a tenant tag identifying one tenant, and a data source tag identifying one data source to which the user is permitted to access data. An isolate tag is received from a user with an user access request to data in a data source, wherein the isolate tag indicates the client tag, tenant tag, and data source tag. The user access request is validated by determining whether the multi-tenancy information indicates that the client, tenant, and data source identified by the client tag, the tenant tag, and the data source tag, respectively, in the isolate tag, are related. The user access request to the data source identified by the data source tag is processed in response to the validating the user access request.

BRIEF DESCRIPTION OF THE DRAWINGS

FIGS. 10a and 10b illustrate an embodiment of operations to process an access request for a data source in the tenant hierarchy.

DETAILED DESCRIPTION

Described embodiments provide improvements to computer technology for controlling and isolating access to storage resources in a multi-tenant storage environment. Described embodiments provide improvements by providing multi-tenancy information of client units, including sub-units of clients, which encapsulate one or more lower level sub-units of the client, such as tenants, or data sources. This multi-tenancy information may then be used to verify that client, tenant and data source tags a user provides with an access request are related and assigned in the multi-tenancy information to the user submitting the request.

Described embodiments allow for scalable addition of clients, tenants, data sources, and users by adding new clients, tenants, data sources, and users to the multi-tenancy information and providing users the isolate tags of the related client, tenant and data source the user is permitted to access. Further, the isolate tag is used to determine whether the multi-tenancy information relates the client, tenant, and data source identified in the isolate tag with the user presenting the access request to authenticate the user access.

Figure 1:
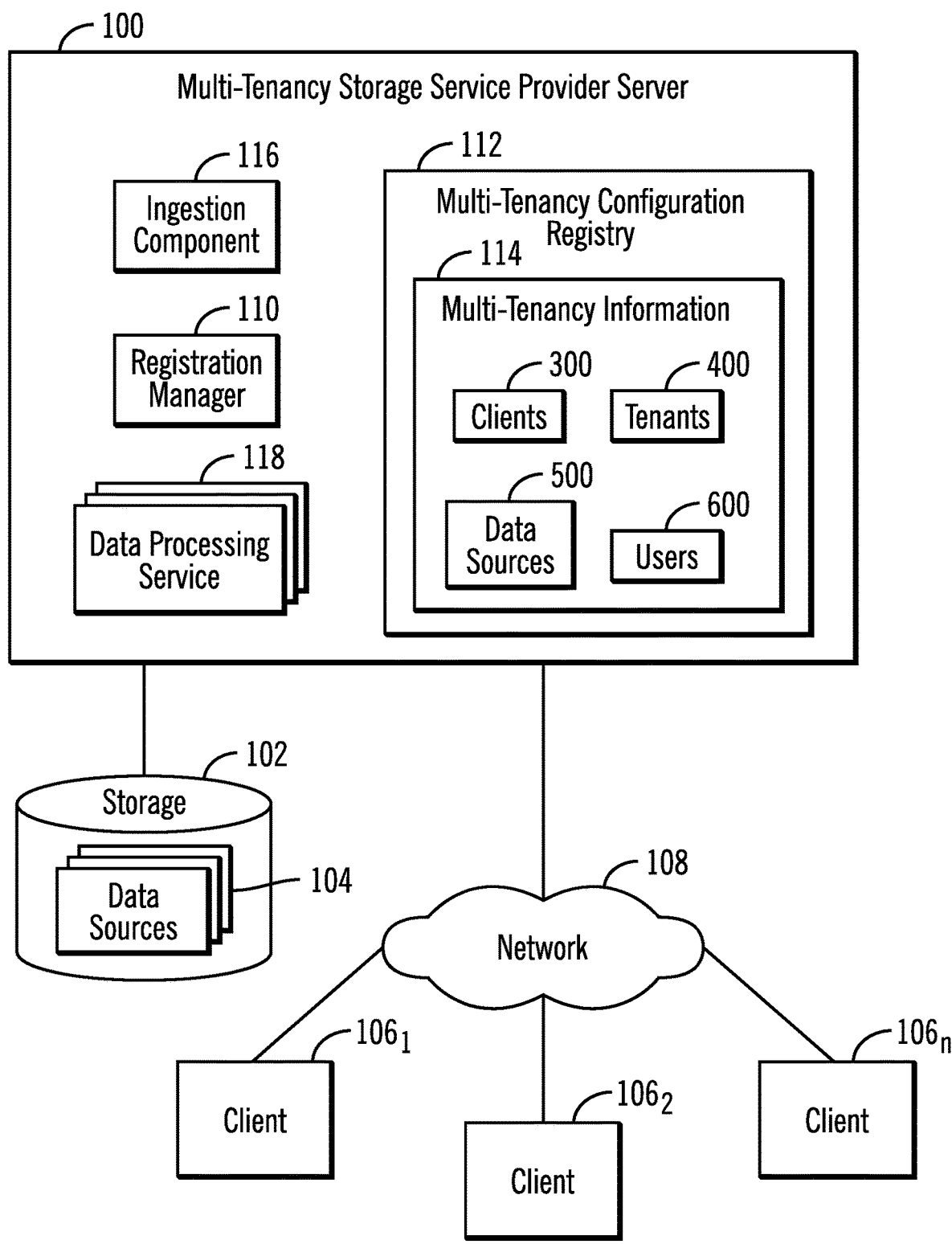
FIG. 1 illustrates an embodiment of a network storage environment.

FIG. 1 illustrates an embodiment of a data storage environment having a multi-tenancy storage service provider server 100 managing files and data sources for different user groups to isolate the files and data sources that are available. The multi-tenancy storage service provider server 100 is coupled to a storage 102 in which data sources 104 are configured providing separate and isolated storage regions in which files, data and database records for different users may be stored, isolated from one another through the configuration of clients, tenants and data sources in the multi-tenancy configuration registry 112. Users at client systems $106_1$, $106_2 \ldots 106_n$ may communicate data access requests to the multi-tenancy storage service provider server 100 with respect to data in the data sources 104 over a network 108.

The multi-tenancy storage service provider server 100 includes a registration manager 110 to register clients, tenants, data sources, and users with the server 100. A client may comprise an organization that has subscribed to the data storage services offered by the operator of the multi-tenancy storage service provider server 100. The client element in the hierarchy may have various sub-units or divisions referred to as tenants, each having different and specific data storage needs. The client may arrange to have one or more data sources assigned to the tenants of the client to provide data storage for the client tenants. The client may further register users of the client to be associated with the data sources for tenants, where a registered user may be a member or associated with a tenant of the client and a data source of the tenant. There may be additional levels in the hierarchy for different possible breakdowns or units of the client than tenants and data sources. The configuration of clients, tenants, data sources and users may be represented in a multi-tenancy configuration registry 112 having multi-tenancy information 114 comprised of one or more clients 300, where each client 300 is associated with one or more tenants 400, where each tenant 400 is assigned one or more data sources 500, and where users 600 are assigned to one or more data sources 500. The clients, tenants, data sources, and users may be represented in a hierarchical relationship. In further embodiments, there may be additional levels of the hierarchy, such as tenants and clients.

The multi-tenancy storage service provider server 100 includes an ingestion component 116 to process incoming data access requests, including read and write requests, and multiple data processing services 118 that are called to process data for read and write requests. The data processing services 118 may comprise encryption, compression, formatting, and other data operations.

The ingestion component 116, registration manager 110, data processing services 118, and multi-tenancy configuration register 112 may be implemented as software in the multi-tenancy storage service provider server 100 or as software as a service (SaaS), wherein the tenant hierarchy storage is offered as a service, such as a cloud based service.

The storage 102 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STT-RAM), conductive bridging RAM (CBRAM), magnetic hard disk drive, optical disk, tape, etc. Data in the storage 102 may further be configured from an array of devices, such as Just a Bunch of Disks (JBOD), Direct Access Storage Device (DASD), Redundant Array of Independent Disks (RAID) array, virtualization device, etc. Further, the storage 102 may comprise heterogeneous storage devices from different vendors and different types of storage devices, such as a first type of storage devices, e.g., hard disk drives, that have a slower data transfer rate than a second type of storage devices, e.g., SSDs.

The network 108 may comprise one or more networks including Local Area Networks (LAN), Storage Area Networks (SAN), Wide Area Network (WAN), peer-to-peer network, wireless network, the Internet, etc.

Figure 2:
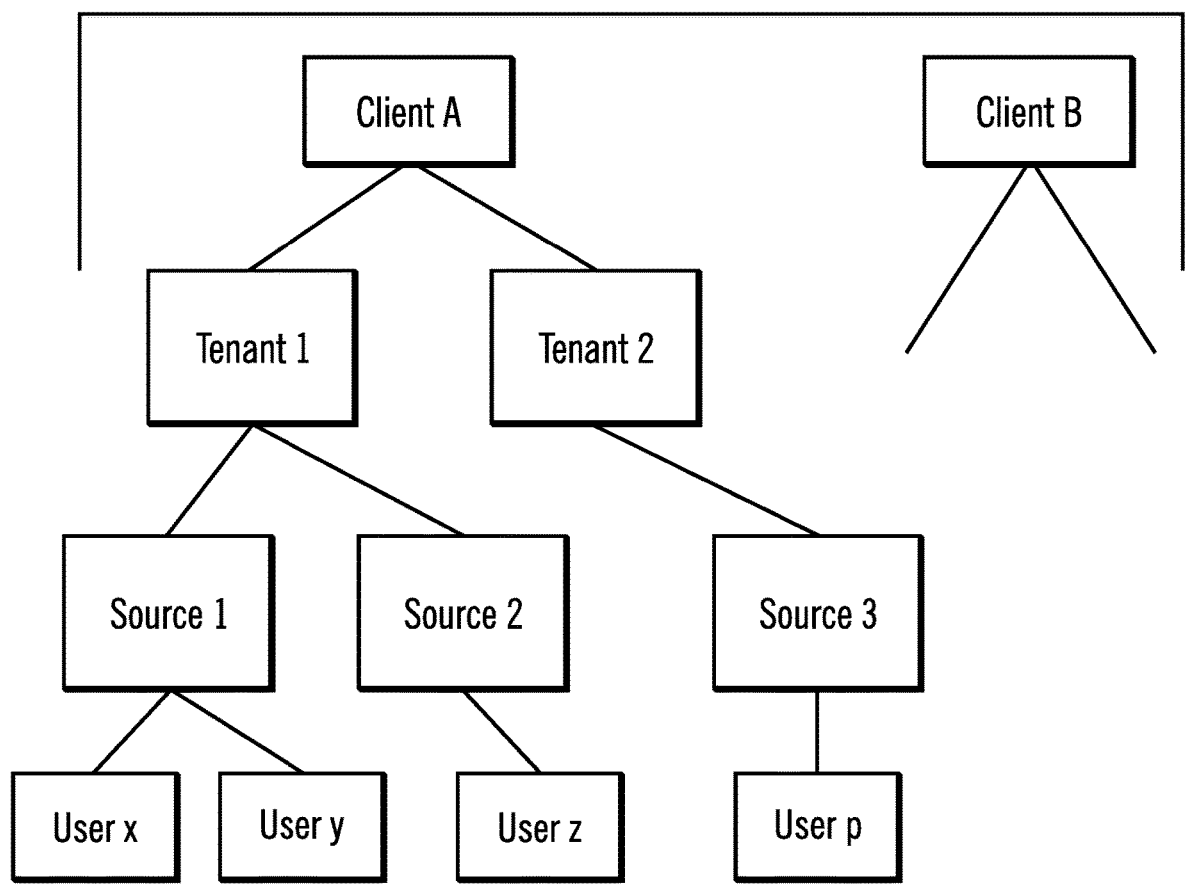
FIG. 2 illustrates an embodiment of a tenant hierarchy.

FIG. 2 illustrates an embodiment of the multi-tenancy information 114 represented as a hierarchy of levels, where the clients, tenants, data sources and users at different levels relate in a hierarchical manner. A user is permitted to access a source on a client/tenant/source path that extends to the user information in the hierarchy, where.

In alternative embodiments, the different nodes, such as client, tenant, and data source nodes, of information may be arbitrarily nested with each other in relationships other than client-tenant-data source, in a non-fixed hierarchy or alternative hierarchies.

Figure 3:
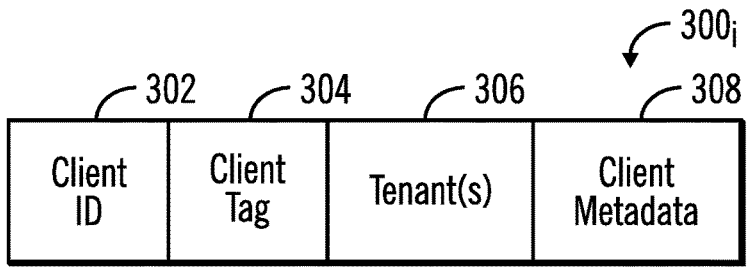
FIG. 3 illustrates an embodiment of client information for clients in the hierarchy.

FIG. 3 illustrates an embodiment of an instance of client information $300_i$ maintained for one client in the multi-tenancy information 114, and includes a client identifier (ID) 302; a client tag 304 used to uniquely identify the client 302 to the users; one or more tenants 306 associated with the client 302; and other client metadata 308.

Figure 4:
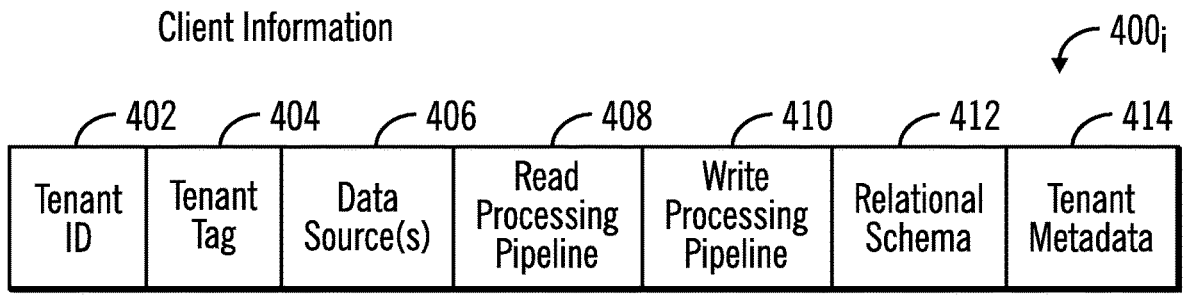
FIG. 4 illustrates an embodiment of tenant information for tenants in the hierarchy.

FIG. 4 illustrates an embodiment of an instance of tenant information $400_i$ maintained for one client in the multi-tenancy information 114, and includes a tenant identifier (ID) 402; a tenant tag 404 used to uniquely identify the tenant 402 to the users; one or more data sources 406 associated with the tenant 402; a read processing pipeline 408 indicating a flow of data processing services 118 to apply to data read from a data source 406 assigned to the tenant $400_i$; a write processing pipeline 410 indicating a flow of data processing services 118 to apply to write data provided with a write request to write to a data source 404 assigned to the tenant; a relational schema 412 describing a relationship or organization of data with respect to how the data is stored, such as in a database schema of a database in the data source 104, such as rows, columns, attributes to which the data maps; and other tenant metadata 414.

Figure 5:
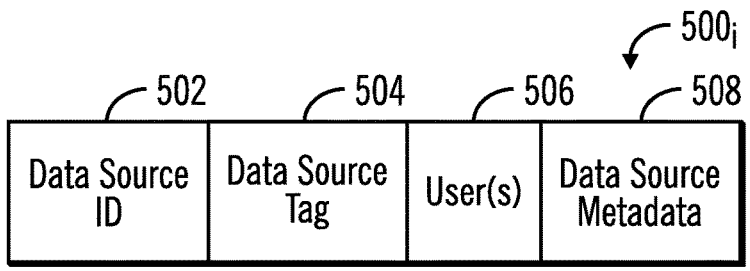
FIG. 5 illustrates an embodiment of data source information for data sources in the hierarchy.

FIG. 5 illustrates an embodiment of an instance of data source information $500_i$ maintained in the multi-tenancy information 114, and includes a data source identifier (ID) 502 representing a data source 104 in the storage 102; a data source tag 504 used to uniquely identify the data source to the users; one or more users 506 assigned to use the data source 502; and data source metadata 508 providing further information on the data source 502, such as the type of storage devices in which the data source 502 is configured, logical storage configuration, location or logical volume in the storage 102 to access the data source 104 represented by the information $500_i$, etc.

In additional embodiments, the processing pipeline 408, 410 and relational schema 512 information may be associated with a different level of the multi-tenancy information 114, such as at the client level to apply to data for any tenant and data source, or at the data source level.

Figure 6:
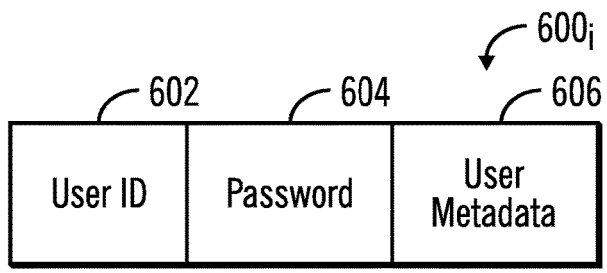
FIG. 6 illustrates an embodiment of user information for a user in the hierarchy.

FIG. 6 illustrates an embodiment of user information $600_i$ which may be assigned to a data source $500_i$ in user field 506, including a user ID 602 identifying the user, a password 604, and user metadata 606 providing information on the user.

The relationship of the clients, tenants, data sources and users in the client 300, tenant 400, data source 500, and user 600 information may form a hierarchical relationship of the elements, where the tenants 306 comprise children of the tenants 400, the data sources 406 comprise children of the tenants 400, and the users 506 comprise the children of the data sources 500. In alternative embodiments, there may be other relationships of the clients, tenants, and users in alternative hierarchies, such as a data source or user may be associated directly with a client or user.

The above tags 304, 404, 504 may remain fixed to ensure the integrity of the ownership information and enforcement during access. The described embodiments provide dynamic separation of data storage and processing at any of the levels in the hierarchy based on an isolate tag the user supplies with a data access request to the multi-tenancy storage service provider server 100, such as a read or write request.

Figure 7:
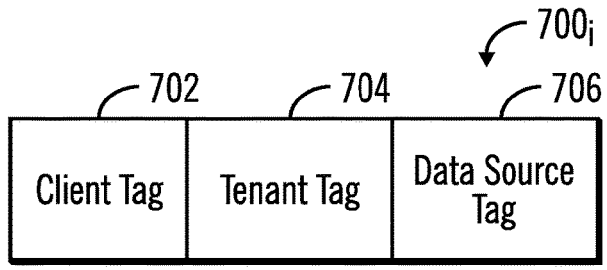
FIG. 7 illustrates an embodiment of an isolation tag.

FIG. 7 illustrates an embodiment of an isolate tag 700 provided to the user to present when submitting any read or write access request to the multi-tenancy storage service provider server 100, comprising a client tag 702, tenant tag 704, and data source tag 706 representing the client $300_i$, tenant $400_i$, and data source $500_i$ in the multi-tenancy information 114 the user is authorized to access. The isolate tag 700 fields 702, 704, and 706 may be encrypted before being returned to the user to prevent someone intercepting the isolate tag 700 and presenting to use to access the storage services.

The isolate tag 700 defines an isolation zone of a data source 104 the user is permitted to access, that is isolated from other clients, tenants, and data sources to which other users are assigned. Users may be assigned to different isolation zones, i.e., different data sources in the same or different tenants and clients. In this way, the isolate tag 700 defines the path of defined elements, e.g., client, tenant, and data source, the user is permitted to access. The isolate tag 700 may be encrypted and decrypted using suitable encryption techniques known in the art.

With the described embodiments, the isolation zones are supported and implemented through a software implementation that does not require additional infrastructure requirements to support new data isolation zones for a new tenant, new data source or user because the services that provide processing and storage of data use tags to identify ownership and provide isolation. Minimal administrative cost is required for supporting new data isolation zones, because once the multi-tenancy information 114 is configured in the multi-tenancy configuration repository 112, all the services in the system can dynamically understand ownership based on the isolate tag 700 associated with the request and provide isolation among different tenants, sources or users.

Figure 8:
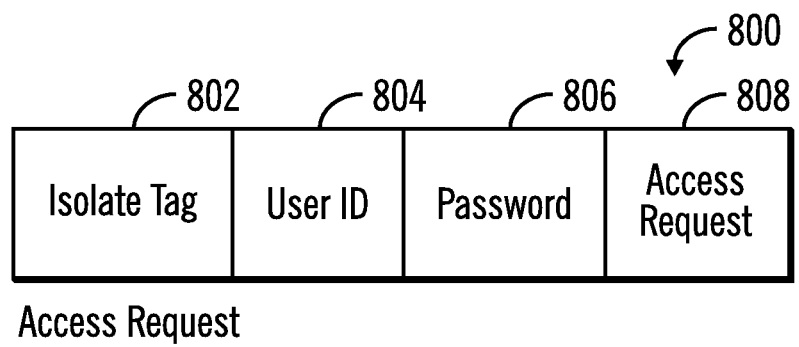
FIG. 8 illustrates an embodiment of an access request.

FIG. 8 illustrates an embodiment of an access request 800 submitted by a user to the ingestion component 116, including an isolate tag 802, comprising the isolate tag 700 presented to the user to use when access the storage services of the multi-tenancy storage service provider server 100; a user ID 804 and password 806 for the user; and an access request 808, comprising a read or write request, and if a write request write data. The isolate tag 802 may be encrypted.

Figure 9:
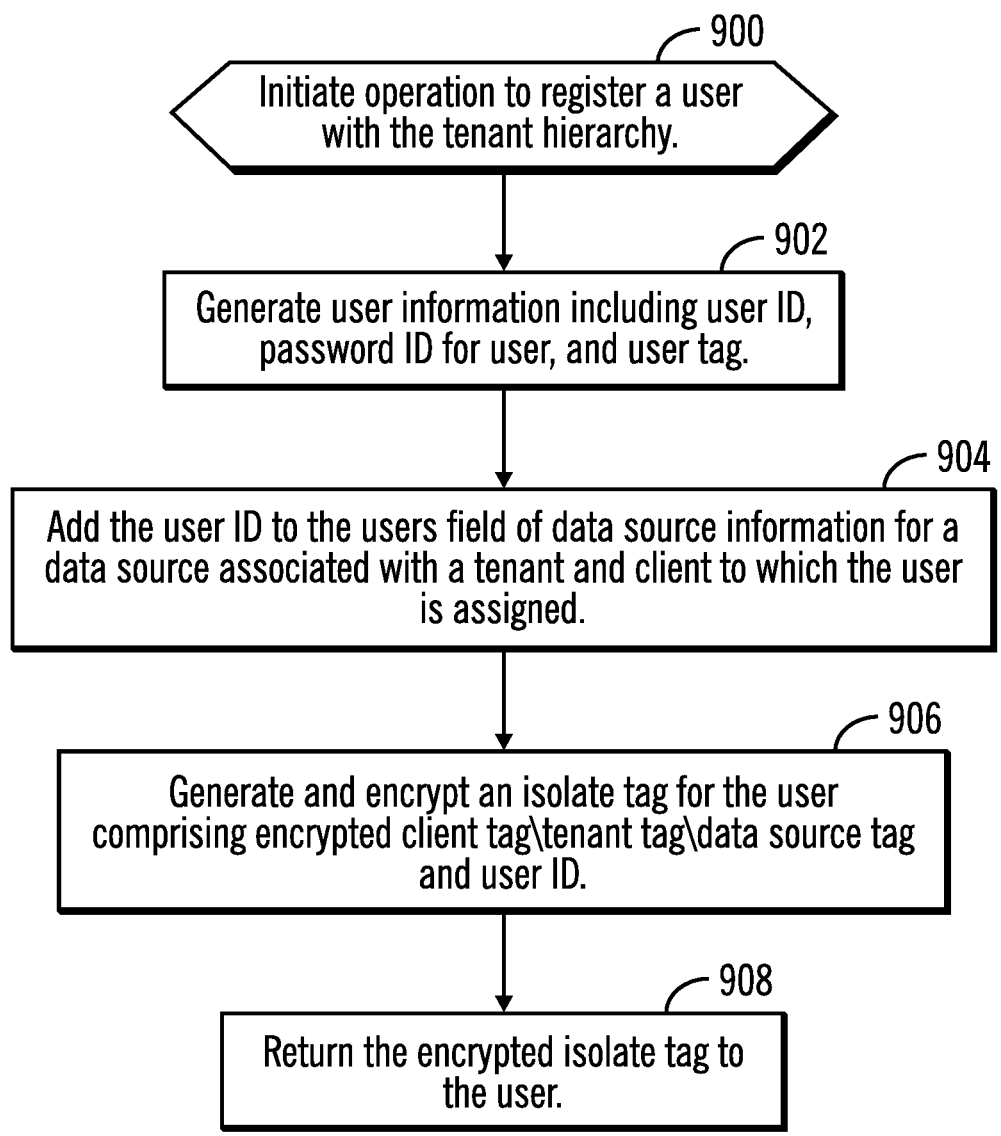
FIG. 9 illustrates an embodiment of operations to register a user with a tenant in the hierarchy.

FIG. 9 illustrates an embodiment of operations performed by the registration manager 110 to register a user with the multi-tenancy information 114. Upon initiating (at block 900) an operation to register a user with the tenant hierarchy, the registration manager 110 generates (at block 902) user information $600_i$ for the user including a user ID 602 and password 604, which may be determined by interacting with the user at a client $106_i$. The user ID 602 is added (at block 904) to the users field 506 of data source information $500_i$ for a data source 104 associated with a tenant $400_i$, which is associated with a client $300_i$ to which the user is assigned. The registration manager 110 generates and encrypts (at block 906) an isolate tag 700 for the user comprising the client tag 304, tenant tag 404 and data source tag 504 in encrypted isolate tag fields 702, 704, and 706, respectively, representing the client, tenant and data source with which the user is in the multi-tenancy information 114. The encrypted isolate tag 700 is then returned (at block 908) to the user to present with every data access request the user is to present to the multi-tenancy storage service provider server 100 to access data sources 104 and data processing services 118 from the multi-tenancy storage service provider server 100.

With described embodiments, when a user registers for the storage services offered by the a multi-tenancy storage service provider server 100, the hierarchy identified in the isolate tag 700 is defined as per the user's data isolation needs and information on the user included in the multi-tenancy configuration registry 112. The user IDs are assigned against the nodes in the hierarchy at a level of access at which the user is permitted. For instance, a user ID may be associated with a tenant $400_i$ or client $300_i$ information/nodes in the hierarchy to then be given access to all levels below the level at which the user ID is associated.

Figure 10B:
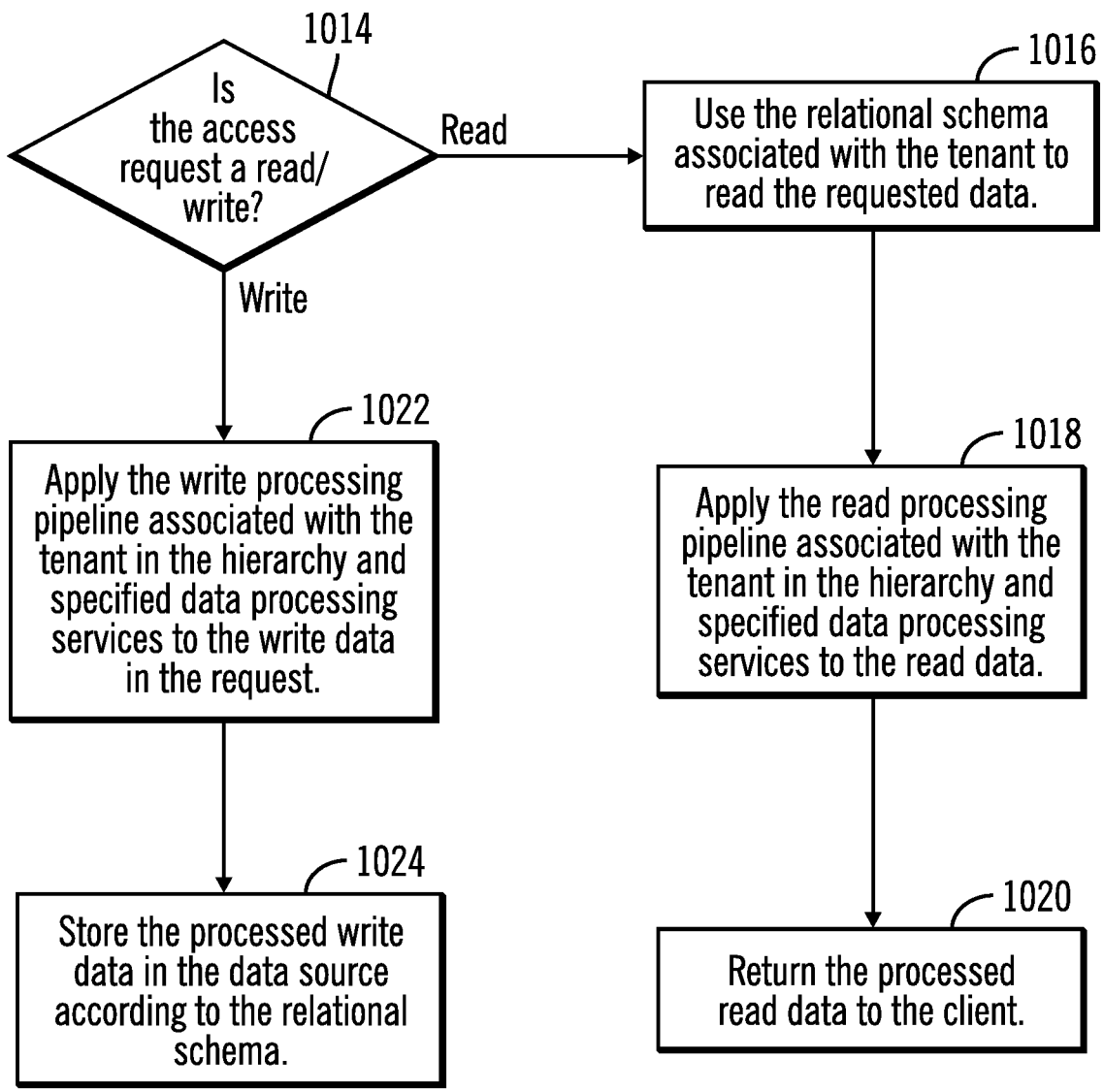

FIGS. 10a and 10b illustrate an embodiment of operations performed by the ingestion component 116 to process an access request 800. Upon initiating (at block 1000) ingestion processing, the ingestion component 116 decrypts (at block 1001) the client 702, tenant 704, and data source 706 tags in the received isolate tag 802. The ingestion component 116 determines (at block 1002) whether the password 806 in the access request 800 matches the password 604 in the user information $600_i$ for the user ID 602 matching the user ID 804 in the access request 800. If (at block 1002) there is a match, then the ingestion component 116 determines (at block 1004) whether the user ID 804 in the access request 800 is assigned to a data source $500_i$, as indicated in user field 506, in the multi-tenancy information 114 having a data source tag 504 matching the data source tag 706 in the isolate tag 802 in the access request 800. If (at block 1004) the user ID 804 in the request is assigned to a data source $500_i$ identified by data source tag 706 in the isolate tag 802 presented with the access request 800, then the ingestion component 116 determines (at block 1006) whether the data source $500_i$, to which the user ID 804 is assigned, is assigned to a tenant $400_i$, as indicated in the data source field 406 of the tenant information $400_i$ having a tenant tag 404 matching the tenant tag 704 in the isolate tag 802 of the access request 800.

If (at block 1006) the data source $500_i$, identified by the data source tag 706 in the isolate tag 802, is assigned to a tenant $400_i$ having a tenant tag 404 matching the decrypted tenant tag 704, then the ingestion component 116 determines whether the assigned tenant is assigned 804 to a client $300_i$ in the multi-tenancy information 114 by determining (at block 1008) whether the assigned tenant $400_i$ (assigned the data source $500_i$ having the user ID 804) is assigned to a client $300_i$ having a client tag 304 matching the client tag 702 in the isolate tag 802 in the access request 800. If so, then control proceeds to block 1015 in FIG. 10b to process the access request 800. Otherwise, if at block 1002, 1004, 1006, and 1008 the isolate tag 802 in the access request 800 does not define a hierarchy of client/tenant/data source in the multi-tenancy information 114 to which the user is assigned, then fail is returned (at block 1010) to the access request 800

At block 1014 in FIG. 10b, if the access request is a read, then the ingestion component 116 uses (at block 1016) the relational schema 412 associated with the tenant $400_i$ including the data source $500_i$ of the user 804 to read the requested data in the format of the relational schema 412. The ingestion component 116 applies (at block 1018) the read processing pipeline 408 associated with the tenant $400_i$ in the hierarchy and the specified data processing services 118, according to the workflow defined in the read processing pipeline 408, to the read data. The processed read data is returned (at block 1020) to the user. If (at block 1014) the request is a write, then the ingestion component 116 applies (at block 1022) the write processing pipeline 410 associated with the tenant $400_i$ in the hierarchy and specified data processing services 118 to the write data in the request 800. The ingestion component 116 stores (at block 1024) the processed write data in the data source 104 identified by the data source $500i$ of the data source tag according to the relational schema 412. In certain embodiments, the data stored in a data source 104 may be stored with the isolate tag 700 identifying the client/tenant/data source hierarchy of the data source to be available to verify the proper storage and processing isolation is applied to the stored data.

With the described operations of FIGS. 10a and 10b, the relationships defined in the multi-tenancy information 114 of the client, tenant, and data source determine whether the isolate tag 802 the user presents permits the user access to the requested client/tenant/data source presented in the isolate tag 802 of the access request 800. Further, data from a user is stored in an isolation region or data source 104 defined by the isolate tag 802 presented by the user in the request. Further, the data processing services 118 applied to the data involved in the request 800 is determined by the data processing services defined in the pipelines 408, 410 associated with the tenant identified in the tenant tag 704 in the isolate tag 802 of the request. In this way, described embodiments provide improved techniques for processing user access requests by using an isolate tag provided with the access request to authenticate the user access to the requested client/tenant/data source, to determine where to store the user data, isolated from data stored for other data sources 104, and to determine and isolate the processing applied to the data subject to the user request. Thus, in addition to guaranteeing isolation of the data between tenants while at rest in the storage 102, the processing of the data is also performed with isolation between the tenants or other level, such as data sources or clients.

With the described embodiments, when clients write data into the system with the appropriate isolate tags, the data is sent for processing through a pipeline that is configured for the tenant as defined in the isolate tag. This enables tenant specific processing pipelines with unique steps to be built and executed for the tenant's data. All the data processing services 118 that process the data have access to the tenancy tag meta-data and the tenant hierarchy 14 that ensures proper isolation to the processing of tenant data. Any intermediate processing related artifacts and the final processed results are stored with the associated isolate tag.

In the described embodiments, when a user wants to access data stored in the cloud under their tenant, they supply the tenant hierarchy related isolate tags 802 for the data they are trying to retrieve along with a query for the data, which may comprise a read or write command, put or get command, or a database query, such as a Structure Query Language (SQL) query. The ingestion component 116 validates the user credentials (user ID 804 and password 806) and the isolate tag 802 providing a requested client/tenant/data source tags against the relationship of the clients, tenant and data sources defined in the multi-tenancy information 114 to ensure the request is valid before writing, extracting and returning the data.

In certain embodiments, a user may be associated with multiple isolation zones, such as multiple data sources in the same or different tenants, and associated with tenants in the same or different clients.

The reference characters used herein, such as i, n are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
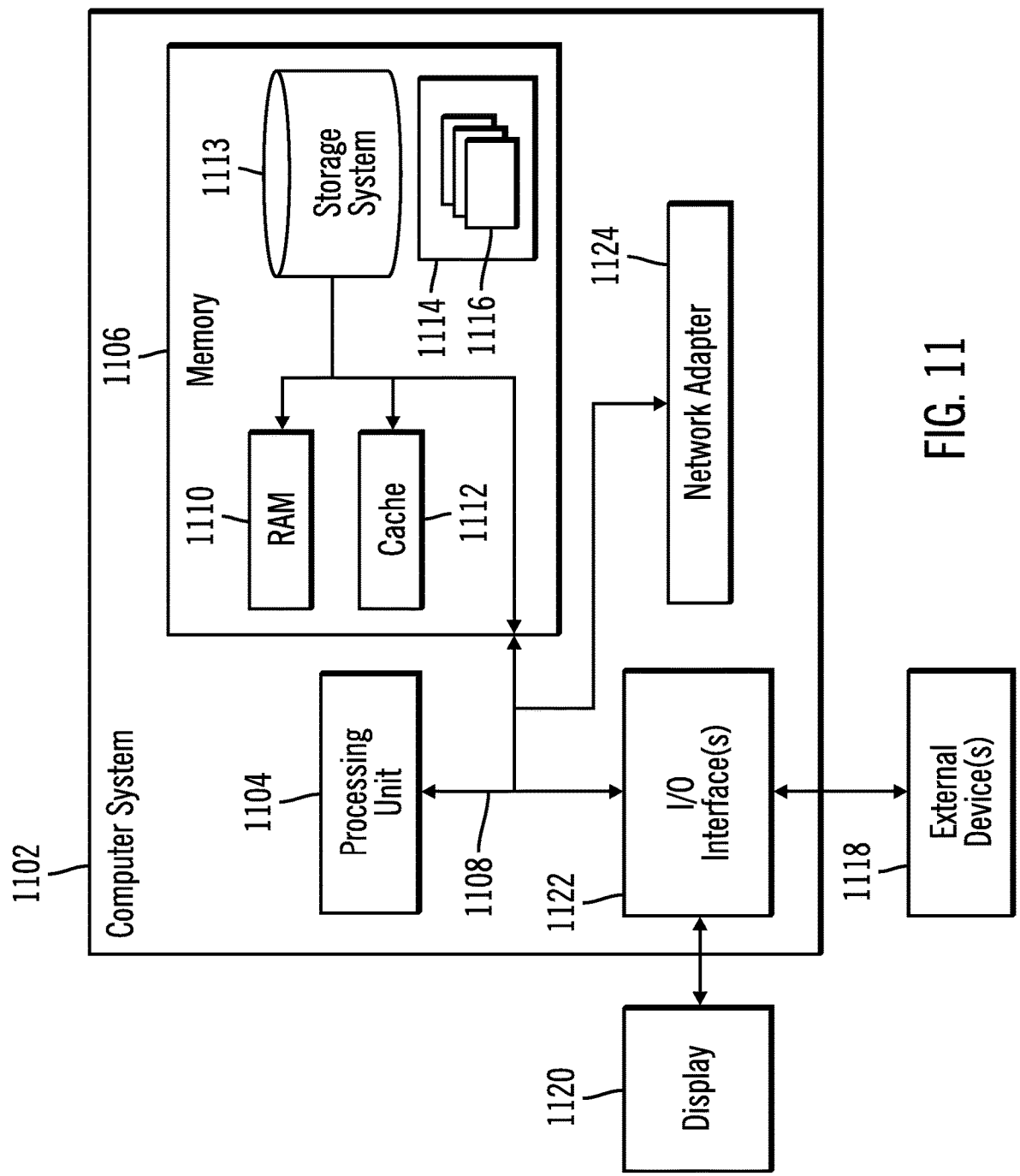
FIG. 11 illustrates a computing environment in which the components of FIG. 1 may be implemented.

The computational components of FIG. 1, including the multi-tenancy storage service provider server 100 and clients $106_1 \ldots 106_n$, may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device.

The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing access to data storage services in a network environment, wherein the computer program product comprises a computer readable storage medium having program instructions embodied therewith that when executed cause operations, the operations comprising:

registering a user with a data source associated with a tenant and a client, wherein the user is associated with the client associated with the data source, and wherein the user is permitted to access the data source with which the user is registered;

providing to the user, registered with the data source, an isolate tag comprising a client tag identifying the client with which the user is associated, a tenant tag identifying the tenant associated with the data source, and a data source tag identifying the data source with which the user is registered;

validating a user access request, from the user provided the isolate tag, by determining: that the user is assigned to a data source identified by the data source tag; that the data source to which the user is assigned is assigned to a tenant identified by the tenant tag; and that the tenant assigned to the data source is assigned to a client identified by the client tag; and processing the user access request to the data source identified by the data source tag in response to the validating the user access request.

2. The computer program product of claim 1, wherein the user access request is validated in response to:

determining that the user submitting the user access request is assigned to a data source identified by the data source tag in the isolate tag with the user access request;

determining that the data source to which the user is assigned is assigned to a tenant identified by the tenant tag in the isolate tag with the user access request; and determining that the tenant to which the data source is assigned is assigned to a client identified by the client tag in the isolate tag with the user access request.

3. The computer program product of claim 1, wherein the user access request comprises a write request to write data, wherein the processing the user access request further comprises:

writing the isolate tag with the write in the user access request in the data source identified by the data source tag in the isolate tag.

4. The computer program product of claim 1, wherein the operations further comprise:

providing a hierarchical relationship of clients to tenants, tenants to data sources, and data sources to tenants, wherein a user assigned to a higher level in the hierarchical relationship than a data source, including a client or tenant, is permitted to access all data sources assigned to the client or tenant to which the user is assigned, wherein the user assigned to a client is permitted to access all data sources assigned to at least one tenant assigned to the client to which the user is assigned.

5. The computer program product of claim 1, wherein all user access requests to data in data sources must include an isolate tag in order to be processed, wherein users cannot access data sources not indicated in the isolate tag presented by the user.

6. The computer program product of claim 1, wherein at least one user is provided multiple isolate tags including at least one of different data source tag, tenant tag, and client tag to provide access to different data sources.

7. The computer program product of claim 1, wherein the operations further comprise:

registering the user to access data storage services by generating user information for the user to register;

adding an identifier for the user to register to data source information for a data source for the user to register to use that is also associated with a tenant and client associated with the user;

generating the isolate tag for the user to register including a client tag for the client associated with the user, a tenant tag of the tenant associated with the user, and a data source tag of the data source for the user to register to use; and returning the isolate tag to the user to use to access the data source.

8. A system for providing access to data storage services in a network environment, comprising:
a processor;
multi tenancy information on clients subscribing to the data storage services, wherein and
a computer readable storage medium having program instructions embodied therewith that when executed by the processor cause operations, the operations comprising:
registering a user with a data source associated with a tenant and a client, wherein the user is associated with the client associated with the data source, and wherein the user is permitted to access the data source with which the user is registered;
providing to the user, registered with the data source, an isolate tag comprising a client tag identifying the client with which the user is associated, a tenant tag identifying the tenant associated with the data source, and a data source tag identifying the data source with which the user is registered;
validating a user access request from the user provided the isolate tag, by determining that the user is assigned to a data source identified by the data source tag; that the data source to which the user is assigned is assigned to a tenant identified by the tenant tag; and that the tenant assigned to the data source is assigned to a client identified by the client tag; and
processing the user access request to the data source identified by the data source tag in response to the validating the user access request.

9. The system of claim 8, wherein the user access request is validated in response to:
determining that the user submitting the user access request is assigned to a data source identified by the data source tag in the isolate tag with the user access request;
determining that the data source to which the user is assigned is assigned to a tenant identified by the tenant tag in the isolate tag with the user access request; and
determining that the tenant to which the data source is assigned is assigned to a client identified by the client tag in the isolate tag with the user access request.

10. The system of claim 8, wherein the user access request comprises a write request to write data, wherein the processing the user access request further comprises:
writing the isolate tag with the write in the user access request in the data source identified by the data source tag in the isolate tag.

11. The system of claim 8, wherein the operations further comprise:
providing a hierarchical relationship of clients to tenants, tenants to data sources, and data sources to tenants, wherein a user assigned to a higher level in the hierarchical relationship than a data source, including a client or tenant, is permitted to access all data sources assigned to the client or tenant to which the user is assigned, wherein the user assigned to a client is permitted to access all data sources assigned to at least one tenant assigned to the client to which the user is assigned.

12. The system of claim 8, wherein all user access requests to data in data sources must include an isolate tag in order to be processed, wherein users cannot access data sources not indicated in the isolate tag presented by the user.

13. The system of claim 8, wherein at least one user is provided multiple isolate tags including at least one of different data source tag, tenant tag, and client tag to provide access to different data sources.

14. The system of claim 8, wherein the operations further comprise:
registering the user to access data storage services by generating user information for the user to register;
adding an identifier for the user to register to data source information for a data source for the user to register to use that is also associated with a tenant and client associated with the user;
generating the isolate tag for the user to register including a client tag for the client associated with the user, a tenant tag of the tenant associated with the user, and a data source tag of the data source for the user to register to use; and
returning the isolate tag to the user to use to access the data source.

15. A method for providing access to data storage services in a network environment, comprising:
registering a user with a data source associated with a tenant and a client, wherein the user is associated with the client associated with the data source, and wherein the user is permitted to access the data source with which the user is registered;
providing to the user, registered with the data source, an isolate tag comprising a client tag identifying the client with which the user is associated, a tenant tag identifying the tenant associated with the data source, and a data source tag identifying the data source with which the user is registered;
validating a user access request from the user provided the isolate tag, by determining: that the user is assigned to a data source identified by the data source tag; that the data source to which the user is assigned is assigned to a tenant identified by the tenant tag; and that the tenant assigned to the data source is assigned to a client identified by the client tag; and
processing the user access request to the data source identified by the data source tag in response to the validating the user access request.

16. The method of claim 15, wherein the user access request is validated in response to:
determining that the user submitting the user access request is assigned to a data source identified by the data source tag in the isolate tag with the user access request;
determining that the data source to which the user is assigned is assigned to a tenant identified by the tenant tag in the isolate tag with the user access request; and
determining that the tenant to which the data source is assigned is assigned to a client identified by the client tag in the isolate tag with the user access request.

17. The method of claim 15, wherein the user access request comprises a write request to write data, wherein the processing the user access request further comprises:
writing the isolate tag with the write in the user access request in the data source identified by the data source tag in the isolate tag.

18. The method of claim 15, further comprising:

providing a hierarchical relationship of clients to tenants, tenants to data sources, and data sources to tenants, wherein a user assigned to a higher level in the hierarchical relationship than a data source, including a client or tenant, is permitted to access all data sources assigned to the client or tenant to which the user is assigned, wherein the user assigned to a client is permitted to access all data sources assigned to at least one tenant assigned to the client to which the user is assigned.

19. The method of claim 15, wherein all user access requests to data in data sources must include an isolate tag in order to be processed, wherein users cannot access data sources not indicated in the isolate tag presented by the user.

20. The method of claim 15, wherein at least one user is provided multiple isolate tags including at least one of different data source tag, tenant tag, and client tag to provide access to different data sources.

21. The method of claim 15, wherein the operations further comprise:
registering the user to access data storage services by generating user information for the user to register;
adding an identifier for the user to register to data source information for a data source for the user to register to use that is also associated with a tenant and client associated with the user;
generating the isolate tag for the user to register including a client tag for the client associated with the user, a tenant tag of the tenant associated with the user, and a data source tag of the data source for the user to register to use; and
returning the isolate tag to the user to use to access the data source.

* * * * *